United States Patent Office 3,265,354
Patented August 9, 1966

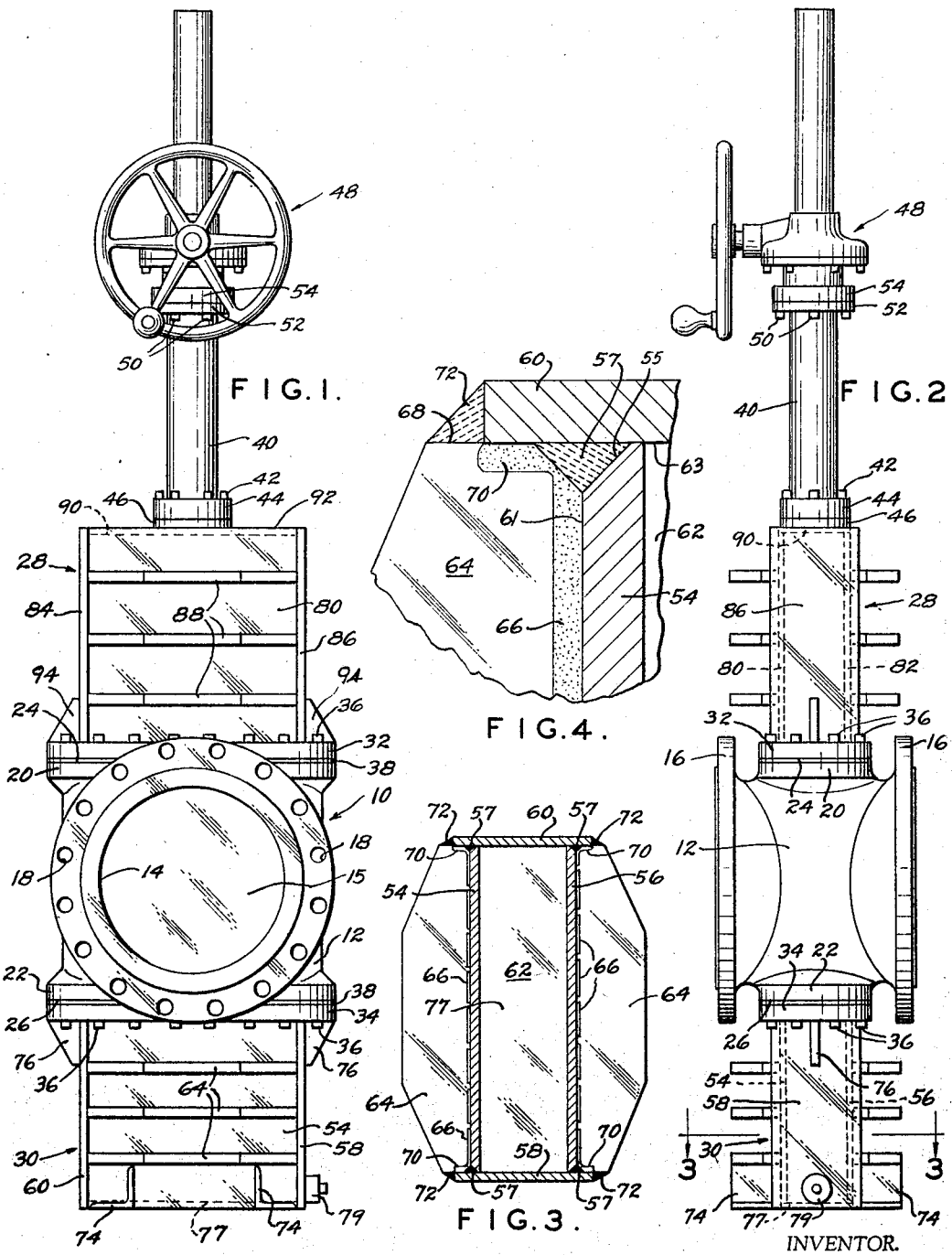

3,265,354
VALVE
Clifford E. Anderson, Houston, Tex., assignor to ACF Industries, Incorporated, New York, N.Y., a corporation of New Jersey
Filed Dec. 30, 1963, Ser. No. 334,463
8 Claims. (Cl. 251—329)

This invention relates generally to gate valves, in particular to gate valves employing a fabricated valve body.

In large valve applications, for example in valves having bores of eight inches in diameter or larger, it has been a practice to provide valve body castings for retaining the reciprocating gate member and sealing members. In high pressure applications, cast valve bodies have been reliable and serviceable.

The cost of producing valve body castings has been extremely high since the cost of the patterns for producing the casting represents a large initial expense which, if the number of valve bodies to be produced is small, such as is usually the case, makes the castings quite expensive.

In order to reduce the cost of valves of this nature and to produce a highly competitive valve, and yet a valve which is reliable in operation and which will withstand high pressures, efforts have been made to produce a fabricated valve body, employing inexpensive welded plate metal construction. Generally the valve bore was formed by a pair of spaced forged tubular hub members and the plate metal forming the major portion of the valve body was welded thereto.

While the fabrication of low pressure valves has been successfully applied in some special applications, they are not generally satisfactory in pipeline or pipe system applications. The valve at times must not only retain the pressure of the lading flowing through the valve, but it must also carry external loads applied to the valve body by the line. In fabricated valves the gate member must extend through the space between the forged tubular hub portions, thus requiring that the structural sides of the valve body carry the external loads. While simple structural valves will support light loads, in heavier applications additional structure must be provided for support of the heavier loads. In various applications having high structural requirements additional external body structure has been provided to carry the line loads, but the cost of reinforced fabricated body structure generally approaches the cost of a cast valve body.

In a gate valve, and especially in a slab gate valve, the valve seats must be maintained in a parallel relationship with the gate member to effect a seal. In certain specific fabricated gate valves the spaced hub portions are formed with annular opposed seat recesses.

Valve seat members are placed in the recesses and are actuated by the lading under line pressure to establish a seal. The hub portions are manufactured into the valve body in such a manner that the opposed seat recesses formed therein are parallel. If the fabricated valve body is not sufficiently strong to carry a bending moment which is applied by the line, one of the hub portions may be moved relative to the other so that the opposed seat recesses and consequently the seats are no longer parallel and the seat members will be unable to engage the gate member in such a manner that a proper seal is established.

When fabricated valve bodies or portions thereof are manufactured, it has been a general practice to butt weld the side plates and the end plates using plate metal sufficiently thick that the weld will prevent separation of the plates due to the force of the lading on the interior surfaces of the valve. Reinforcing rib members were then welded to the side plates alone to support the side plates against the lading forces. While such fabricated body structures are quite satisfactory in performance, the plate metal to obtain sufficient welding strength is substantially thick, thus making the valve cost quite high.

Accordingly, it is a primary object of this invention to provide a novel gate valve having upper and lower fabricated body sections fixed to an intermediate cast body section.

It is a further object of this invention to provide a novel structural arrangement for the upper and lower fabricated sections of a gate valve, which arrangement provides multi-directional support for each of the various structural elements thereof.

A further object of this invention is to provide a novel gate valve which is inexpensive in manufacture as well as being reliable in use.

Other and further objects of this invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description and is shown in the accompanying drawings, forming a part of the specification, wherein:

FIGURE 1 is an elevational view illustrating a valve in accordance with the present invention.

FIGURE 2 is a right side elevational view of the valve of FIGURE 1.

FIGURE 3 is a sectional view in plan, taken along lines 3—3 in FIGURE 2.

FIGURE 4 is an enlarged partial sectional view illustrating the structural elements of FIGURE 3 in greater detail.

Briefly, the invention comprises fabricated upper and lower valve sections which are fixed to the cast center section. The structural elements of the fabricated sections employ a relationship which permits their construction from relatively thin plate metal. Each of the structural elements is so related to the other structural elements that each structural element has multidirectional support.

Referring now to the drawing, for a better understanding of the invention, a gate valve 10, as illustrated in FIGURES 1 and 2, is comprised of a cast intermediate section 12 being formed with a through passage 14 and a pair of flanges 16. A series of bolt openings 18 are formed in the flanges 16 through which bolts pass for bolting the valve 10 into a pipe system. Elongated flanges 20 and 22 are formed on the upper and lower portions respectively of the intermediate section 12 and define substantially flat annular sealing surfaces 24 and 26.

An upper fabricated portion of the valve 10, illustrated generally at 28 in FIGURES 1 and 2, and a lower fabricated portion illustrated generally at 30, of the valve 10 are formed with elongated flanges 32 and 34 respectively and are connected to the intermediate section 12 by means of bolts 36 which pass through a series of openings in the flanges 32 and 34 and are threaded into the flanges 20 and 22 of the intermediate section 12. A gasket 38 shaped to correspond with the elongated flanges 20 and 22 is placed between the flanges 20 and 32 and the flanges 22 and 34 to establish a fluidtight seal making the valve a pressure vessel.

A yoke tube 40 is affixed to the upper end of the upper fabricated portion 28 by means of bolts 42 which extend through an annular flange 44 forming the lower end of the yoke tube and are threaded into a bolt circle 46 fixed to the upper fabricated portion of the valve body.

As illustrated in FIGURES 1 and 2, a valve operating device shown generally at 48, which may be a bevel gear operator as shown, or any one of various well-known valve operating devices, is attached to the yoke tube 40 by bolts or threaded studs 50 which extend through an upper flange 52 defining the upper extremity of the yoke tube 40 and are threaded into a flange 54 on the operator device 48.

The lower fabricated portion 30 of the valve body is formed by a pair of spaced planar side plates 54 and 56, which are arranged generally parallel. As illustrated in FIGURES 3 and 4, the side plates 54 and 56 are formed with a beveled surface 55. A pair of end plates 58 and 60 are positioned in abutting relationship with the side plates 54 and 56 in such a manner as to define a converging groove. The end plates 58 and 60 are welded to the side plates 54 and 56 by a vertical weld 57 which fills the converging groove. Welding the end plates 58 and 60 to the side plates 54 and 56 forms a rectangular chamber 62 in which a gate member 15 of the valve 10 reciprocates.

The weld 57 (FIGURE 4) is generally triangular in cross-section and has a portion thereof extending beyond the outer surface 61 of the side plate and along the inner surface 63 of the associated end plate 60. This welding arrangement not only retains the end plates against separation from the ends of the side plates, but also gives additional support against forces tending to shear the weld and move the plate 54 in a direction normal thereto.

In accordance with this invention (FIGURES 3 and 4), the end plates 58 and 60 extend beyond the outer surface 61 of the side plates 54 and 56. A series of substantially planar reinforcing rib members 64 are welded to the side plates by means of horizontal skip-welds 66. The reinforcing ribs 64 are formed with end surfaces 68 which are generally parallel with the inner surface 63 of the end plates 60. The length of the reinforcing rib members 64 is such that each end surface 68 of the rib members engages or abuts with the extended portion of the side plates 60 and are welded thereto by horizontal welds 70 and by vertical welds 72.

A support structure is provided for the lower portion of the lower fabricated portion 30 of the valve 10 by welding a plurality of angle members 74 onto the side plates 54. The upper ends of the side plates 54 and 56 and the end plates 58 and 60 are butt welded to the elongated flange 34 and triangular reinforcing members 76 are welded to both the flange 34 and the side plates to provide additional support for the end plates.

A lower closure plate 77 is welded to the lower ends of the side plates 54 and 56 and the end plates 58 and 60 to close the lower end of the valve chamber.

A drain fitting 79 is manufactured into the lower portion of the end plate 58 and serves to bleed the pressurized lading valve chamber if desired.

The upper fabricated portion 28 of the valve body 10 employs essentially the same structural features and types of welds as does the lower fabricated section 30. A pair of generally parallel side plates 80 and 82 are welded at their lower ends to the elongated flange 32. A pair of side plates 84 and 86 are also welded at their lower ends to the flange 32 and are welded to the side plates in the same manner described above in regard to the lower fabricated portion 30. Horizontal reinforcing ribs 88 are also welded to the side plates and to the extended portion of the end plates 84 and 86 as set forth above. An upper plate 90 (FIGURE 2) is welded to the upper end of the end plates 84 and 86 and to the upper end of the side plates 80 and 82 to close the upper portion of the valve chamber. The flange 46 is welded to the upper surface 92 of the plate 90 and supports the yoke tube and operator assembly in the manner described above. Triangular reinforcing plate members 94 are welded to the end plates 84 and 86 and to the elongated flange 32 in the same manner as discussed below in regard to the plates reinforcing plate members 76.

Since the bending moments and other external forces will be carried by the cast intermediate section 12 of the valve 10, the portions of the valve body which are free from dangerous external forces may be fabricated quite safely from relatively thin plate metal. Due to the novel construction of the upper and lower fabricated portions of the valve, the plate metal from which the portions are constructed may be relatively thin, keeping the manufacturing costs of the valve low. Too, the employment of the structural arrangement discussed hereinabove in the fabrication of the upper and lower sections produces an extremely strong connection and effectively prevents separation of the side and end plates.

From the foregoing, it will be seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matters herein set forth or as shown in the accompanying drawings are to be interpreted as illustrative and not in a limiting sense.

I claim:

1. In a valve having a cast intermediate section with opposing fabricated sections fixed thereto, the improvement comprising: a pair of spaced side plate members, a pair of end plate members abutting said side plate members and defining therewith a generally rectangular enclosure, marginal portions of each of said end plate members extending outwardly beyond the outer surfaces of said side plates, at least one reinforcing plate means positioned in abutment with and being disposed generally perpendicular to each of said side plates and having end surfaces thereof in abutting relationship with each of said end plate members, said end surfaces extending outwardly beyond said marginal portions of said end plates, first weld means rigidly and directly interconnecting said side plate members with said end plate members at the abutment therebetween, second weld means interconnecting said side plate members and said reinforcing means at the abutment therebetween, third weld means rigidly directly interconnecting the inner surface of said end plate members with said reinforcing member whereby said end plate members, said side plate members and said reinforcing plate means are each given multidirectional support.

2. In a valve having a cast intermediate section with opposing fabricated sections fixed thereto, the improvement comprising: a pair of spaced side plate members, a pair of end plate members abutting said side plate members and defining therewith a generally rectangular enclosure, marginal portions of each of said end plate members extending outwardly beyond the outer surfaces of said side plates, at least one reinforcing plate positioned generally perpendicular to each of said side plates and having end surfaces thereof in abutting relationship with each of said end plate members, said end surfaces extending outwardly beyond said marginal portions of said end plates and defining groove means, first weld means rigidly and directly interconnecting said side plate members with said end plate members at the abutment therebetween, second weld means rigidly and directly interconnecting said side plate members and said reinforcing means at the abutment therebetween, third weld means rigidly interconnecting the inner surface of said end plate members with said reinforcing member, fourth weld means filling said groove means and rigidly and directly interconnecting the end surfaces of said reinforcing plate with the marginal portions of said end plate members whereby said end plate members, said side plate members and said reinforcing plate means are each given multidirectional support.

3. In a valve having a cast intermediate section with opposing fabricated sections fixed thereto, the improvement comprising: a pair of spaced side plate members, a pair of end plate members abutting said side plate members and defining therewith a generally rectangular enclosure, marginal portions of each of said end plate members extending outwardly beyond the outer surfaces of said side plates, said side plate members being beveled adjacent said end plate members and defining therewith converging groove means, at least one reinforcing plate positioned generally perpendicular to each of said side plates and having end surfaces thereof in abutting relationship with each of said end plate members, said end surfaces extending outwardly beyond said marginal portions of said end plates, first weld means filling said converging groove means and directly rigidly interconnecting said side plate members with said end plate members at the abutment therebetween, second weld means directly interconnecting said side plate members and said reinforcing means at the abutment therebetween, third weld means rigidly directly interconnecting the inner surface of said end plate members with said reinforcing member at the abutment therebetween whereby said end plate members, said side plate members and said reinforcing plate means are each given multidirectional support.

4. In a valve having a cast intermediate section with opposing fabricated sections fixed thereto, the improvement comprising: a pair of spaced side plate members, a pair of end plate members directly connected to said side plate members and defining therewith a generally rectangular enclosure, marginal portions of each of said end plate members extending outwardly beyond the outer surfaces of said side plates, said side plate members being beveled adjacent said end plate members and defining, with said end plate members, first converging groove means, at least one reinforcing plate means abutting said side plate means and being positioned generally perpendicular to each of said side plates and having end surfaces thereof in abutting relationship with each of said end plate members, said end surfaces extending outwardly beyond said marginal portions of said end plates and defining second converging groove means, first weld means filling said first converging groove means and rigidly directly interconnecting said side plate members with said end plate members at the abutment therebetween, second weld means directly interconnecting said side plate members and said reinforcing means at the abutment therebetween, third weld means rigidly directly interconnecting the inner surface of said end plate members with said reinforcing member, fourth weld means filling said second converging groove means and rigidly directly interconnecting said end plate members with the end surfaces of said reinforcing plate means whereby said end plate members, said side plate members and reinforcing plate means are each given multidirectional support.

5. A gate valve comprising a cast intermediate section having a through passage formed therein, means formed on said intermediate section for connection of said valve into a pipe system, opposing flange means formed on said intermediate section, opposing fabricated body sections fixed to said opposing flange means and defining, with said intermediate section a valve body, each of said fabricated sections being formed by a pair of spaced side plate means, a pair of end plate means abutting said side plate means and defining with said side plate means a generally rectangular enclosure, marginal portions of said end plate means extending outwardly beyond the outer surface of said side plate means, said side plate means adjacent said end plate means being beveled and defining with said end plate means converging groove means, first weld means filling said converging groove means and rigidly interconnecting said side plate means and said end plate means at the abutment therebetween, at least one reinforcing means in abutting relationship with said side plate means and said end plate means, second weld means rigidly interconnecting said reinforcing means and said side plate means at the abutment therebetween, third weld means at the abutment between the reinforcing means and end plate means rigidly interconnecting said reinforcing means and said end plate means whereby each of said side plate means, said end plate means, and said reinforcing means are given multidirectional support.

6. A gate valve comprising a cast intermediate section having a through passage formed therein, means formed on said intermediate section for connection of said valve into a pipe system, opposing flange means formed on said intermediate section, opposing fabricated body sections removably fixed to said opposing flange means and defining with said intermediate section a valve body, each of said fabricated sections being formed by a pair of spaced generally parallel side plate means, a pair of end plate means abutting said side plate means and defining, with said side plate means, a generally rectangular enclosure, marginal portions of said end plate means extending outwardly beyond the outer surface of said side plate means, said side plate means adjacent said end plate means being beveled and defining, with said end plate means, converging groove means, first weld means at the abutment between the side plate means and end plate means filling said converging groove means and rigidly interconnecting said side plate means with said end plate means, at least one reinforcing means positioned generally perpendicular to and in abutting relationship with said side plate means and said end plate means, second weld means rigidly interconnecting said reinforcing means with said side plate means at the abutment therebetween, third weld means at the abutment between the reinforcing means and plate means rigidly interconnecting said reinforcing means and said end plate means, fourth weld means connecting the marginal portion of said end plate with the end of said reinforcing plate, whereby each of said plates and said reinforcing means are given multidirectional support.

7. A gate valve comprising a cast intermediate section having a through passage formed therein, means formed on said intermediate section for connection of said valve into a pipe system, opposing flange means formed on said intermediate section, opposing fabricated body sections removably fixed to said opposing flange means and defining with said intermediate section a valve body, each of said fabricated sections being formed by a pair of spaced generally parallel side plate means, a pair of end plate means abutting said side plate means and defining, with said side plate means, a generally rectangular enclosure, marginal portions of said end plate means extending outwardly beyond the outer surface of said side plate means, said side plate means adjacent said end plate means being beveled and defining with said end plate means, first converging groove means, first weld means at the abutment between said side plate means and said end plate means filling said first converging groove means and rigidly directly interconnecting said side plate means with said end plate means, at least one reinforcing means positioned generally perpendicular to and in abutting relationship with said side plate means and said end plate means, a portion of said reinforcing means extending outwardly beyond said marginal portions of said end plate means and defining, with said marginal portions, second converging groove means, second weld means rigidly and directly connecting said reinforcing means and said side plate means at the abutment therebetween, third weld means directly connecting said reinforcing means and said end plate means, fourth weld means filling said second converging groove means and rigidly and directly connecting the marginal portions of said end plate means with the end of said reinforcing plate means whereby said side plate means, said end plate means and said reinforcing means are given multidirectional support.

8. In a gate valve comprising a cast intermediate section and opposing fabricated body sections fixed to said intermediate section, the improvement comprising, spaced side plate members, end plate members abutting said side plate members and defining therewith a generally rectangular body enclosure, said end plate members having marginal portions thereof extending beyond the outer surface of said side plate members, reinforcing means abutting said side plate members and having end surfaces in abutment with the marginal portions of said end plate members, weld means at the abutments between the end plate members, side plate members and reinforcing members rigidly and directly interconnecting and giving multidirectional support to said side plate members, said end plate members and said reinforcing means.

References Cited by the Examiner
UNITED STATES PATENTS

| | | | |
|---|---|---|---|
| 2,904,306 | 9/1959 | Bryant | 251—367 |
| 2,957,492 | 10/1960 | Volpin | 251—327 X |
| 2,982,514 | 5/1961 | Bryant | 251—329 |
| 3,013,770 | 12/1961 | Anderson et al. | 251—367 X |
| 3,176,956 | 4/1965 | Englert et al. | 251—329 |

M. CARY NELSON, *Primary Examiner.*

S. SCOTT, *Assistant Examiner.*